(12) United States Patent
Wu et al.

(10) Patent No.: US 11,288,893 B2
(45) Date of Patent: Mar. 29, 2022

(54) TOUCH DISPLAY DEVICE WITH FINGERPRINT ANTI-SPOOFING FUNCTION AND ASSOCIATED FINGERPRINT ANTI-SPOOFING METHOD

(71) Applicant: Egis Technology Inc., Taipei (TW)

(72) Inventors: Tung-Yu Wu, Taipei (TW); Tang-Hung Po, Taipei (TW); Yu-Hsuan Lin, Taipei (TW); Bruce C. S. Chou, Taipei (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/073,417

(22) Filed: Oct. 19, 2020

(65) Prior Publication Data

US 2021/0209327 A1   Jul. 8, 2021

Related U.S. Application Data

(60) Provisional application No. 62/956,417, filed on Jan. 2, 2020.

(30) Foreign Application Priority Data

Sep. 3, 2020   (CN) .......................... 202010915575.1

(51) Int. Cl.
  *G06V 40/12*   (2022.01)
  *G02F 1/1333*   (2006.01)
  (Continued)

(52) U.S. Cl.
  CPC ...... *G06V 40/1394* (2022.01); *G02F 1/13338* (2013.01); *G02F 1/163* (2013.01);
  (Continued)

(58) Field of Classification Search
  CPC ............ G06K 9/0012; G06K 9/00087; G06K 9/00906; G06K 9/0004; G06K 9/00114; G06K 9/00013; G02F 1/13338; G02F 1/163; G02F 2001/1635; G02F 1/13312; G06N 3/02; G06N 3/08; G06F 3/0412; G06F 21/32; G06F 3/01; G06V 40/1394; G06V 40/1365; G06V 40/45; G06V 40/1318; G06V 40/1388; G06V 40/13
  See application file for complete search history.

(56) References Cited

U.S. PATENT DOCUMENTS

2015/0356339 A1* 12/2015 Demos ............... G06K 9/00885
  348/77
2017/0091506 A1* 3/2017 Sinha ...................... G06F 21/32

FOREIGN PATENT DOCUMENTS

CN        109196525 A       1/2019

* cited by examiner

*Primary Examiner* — Abhishek Sarma
(74) *Attorney, Agent, or Firm* — Winston Hsu

(57) ABSTRACT

A touch display device with a fingerprint anti-spoofing function and an associated fingerprint anti-spoofing method are provided, where the touch display device may include a touch display panel and a processing circuit. The touch display panel may include a plurality of display units and one or more codebooks, where each of the display units includes a sensor unit, and the one or more codebooks may make the sensor units receive sensing information of an object which is put on the touch display panel. In addition, the processing circuit may obtain the sensing information from the sensor units, and determine whether the object is a real finger based on the sensing information and reference information.

9 Claims, 4 Drawing Sheets

(51) Int. Cl.
*G02F 1/163* (2006.01)
*G06V 40/40* (2022.01)
*G06N 3/02* (2006.01)

(52) U.S. Cl.
CPC ........... *G06N 3/02* (2013.01); *G06V 40/1365* (2022.01); *G06V 40/45* (2022.01); *G02F 2001/1635* (2013.01)

TOUCH DISPLAY DEVICE WITH FINGERPRINT ANTI-SPOOFING FUNCTION AND ASSOCIATED FINGERPRINT ANTI-SPOOFING METHOD

CROSS REFERENCE TO RELATED APPLICATIONS

This application claims the benefit of U.S. provisional application No. 62/956,417, which was filed on Jan. 2, 2020, and is included herein by reference.

BACKGROUND OF THE INVENTION

1. Field of the Invention

The present invention is related to fingerprint anti-spoofing applications, and more particularly, to a touch display device with a fingerprint anti-spoofing function and an associated fingerprint anti-spoofing method.

2. Description of the Prior Art

Since the earliest smart phones were released, security protection which is easily implemented has been an issue in the field. This has led to the fingerprint recognition function which is a recent development. The fingerprint recognition function can recognize a user according to their fingerprint identification, and unlock the phone after verification. Even though manufacturers emphasize that the probability of fingerprint recognition error is less than 1/50000, providing extremely high information security protection, criminals have attempted to adopt various methods to successfully "spoof" the fingerprint recognition system, which decreases its safety. For example, a victim may leave fingerprints on a glass cup when drinking. If a criminal is able to obtain the fingerprints, he/she can utilize a fake fingerprint manufactured by materials such as resin, silica gel, etc. to spoof a general fingerprint sensor. Furthermore, the development of 3-dimensional printing has led to improvements in the technology of fingerprint spoofing. Thus, recognizing real/fake fingerprints has become an important issue of this art.

In view of the above, there is a need for a novel fingerprint anti-spoofing technology to improve safety of the smart phone or other fingerprint recognition devices.

SUMMARY OF THE INVENTION

An objective of the present invention is to provide a touch display device with a fingerprint anti-spoofing function and an associated fingerprint anti-spoofing method, to solve the problems of the prior art.

Another objective of the present invention is to provide a touch display device with a fingerprint anti-spoofing function and an associated fingerprint anti-spoofing method, to improve precision and safety of fingerprint verification devices without introducing any side effect or in a way that is less likely to introduce side effects.

One embodiment of the present invention provides a touch display device with a fingerprint anti-spoofing function, where the touch display device may comprise a touch display panel and a processing circuit. The touch display panel may comprise a plurality of display units, and each of the plurality of display units may comprise a sensor unit. The touch display panel may further comprise one or more codebooks corresponding to one or more sets of display units, where the one or more codebooks may be configured to make the sensor units receive sensing information of an object which is put on the touch display panel. The processing circuit may obtain the sensing information from the sensor units, and determine whether the object is a real finger based on the sensing information and reference information.

Another embodiment of the present invention provides a fingerprint anti-spoofing method, which is applied to a touch display device. The fingerprint anti-spoofing method comprises: utilizing one or more codebooks of a touch display panel of the touch display device to make sensor units within display units corresponding to the codebooks receive sensing information of an object which is put on the touch display panel; transmitting the sensing information to a processing circuit of the touch display device; and utilizing the processing circuit to determine whether the object is a real finger based on the sensing information and reference information.

The present invention utilizes codebooks and color spectrum dividers to obtain color spectrum composition of the sensed object, and compares the color spectrum composition of the sensed object with color spectrum composition of a real fingerprint, to determine whether the sensed object is a real fingerprint. Furthermore, the present invention can utilize a neural network (NN) to perform deep learning for optimizing recognition regarding fake fingerprint images, thereby defending various hack manners. In addition, the embodiments of the present invention will not greatly increase additional costs. Thus, the problem of the related art can be solved without greatly increasing overall costs. In comparison with the related art, the present invention can improve safety of a mobile phone without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention focuses on providing an embedded touch fingerprint anti-spoofing system of a liquid crystal display (LCD) or an organic light-emitting (OLED) display. In comparison with On-Cell, In-Cell combines a touch layer with a display layer, and therefore reduces the circuit area, which is more suitable for fingerprint anti-spoofing of mobile devices, and wearable devices.

Figure 1:
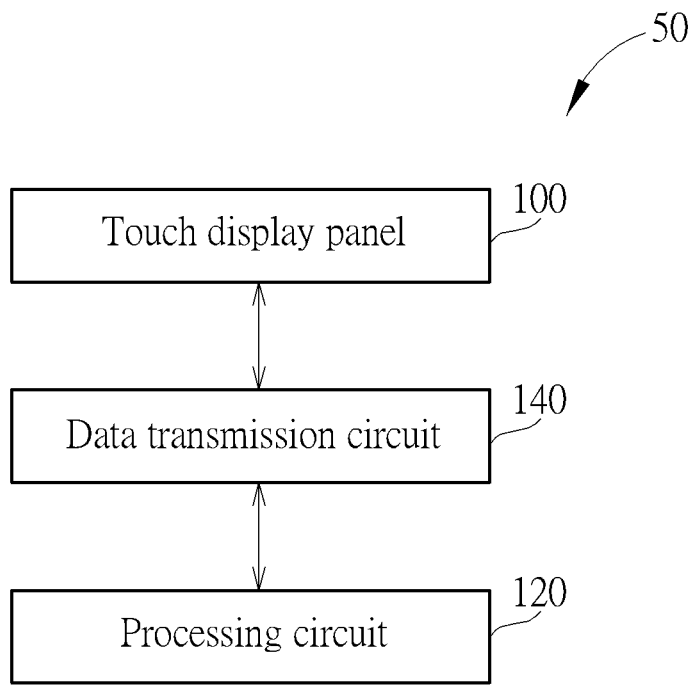
FIG. 1 is a diagram illustrating a touch display device with a fingerprint anti-spoofing function according to an embodiment of the present invention.

FIG. 1 is a diagram illustrating a touch display device 50 with a fingerprint anti-spoofing function according to an embodiment of the present invention, where the touch display device 50 may be a smart phone which includes a fingerprint sensing function, but the present invention is not limited thereto. For example, the technology of the present invention can be applied to a fingerprint detector of a fixed device, and is not limited to mobile devices or wearable devices. As shown in FIG. 1, the touch display device 50 may comprise a touch display panel 100, a processing circuit 120 and a data transmission circuit 140, where the data transmission circuit 140 is coupled between the touch display panel 100 and the processing circuit 120. In this embodiment, the touch display panel 100 may be configured to perform touch display, where a fingerprint recognition function of the touch display device 50 may be configured on the touch display panel 100, e.g. the touch display device 50 may utilize the touch display panel 100 to obtain information (e.g. fingerprint information) of an object (e.g. a finger) which is put on the touch display panel 100. In addition, the processing circuit 120 may obtain the information from the touch display panel 100 through the data transmission circuit 140 and perform associated processing (e.g. perform analysis and comparison on the fingerprint information). In some embodiments, the processing circuit 120 and the data transmission circuit 140 may be configured in different packages. In some embodiments, the processing circuit 120 and the data transmission circuit 140 may be manufactured as different integrated circuits (ICs) or chips which are configured in a same package. In some embodiments, the processing circuit 120 and the data transmission circuit 140 may be integrated into a same IC or chip.

Figure 2A:
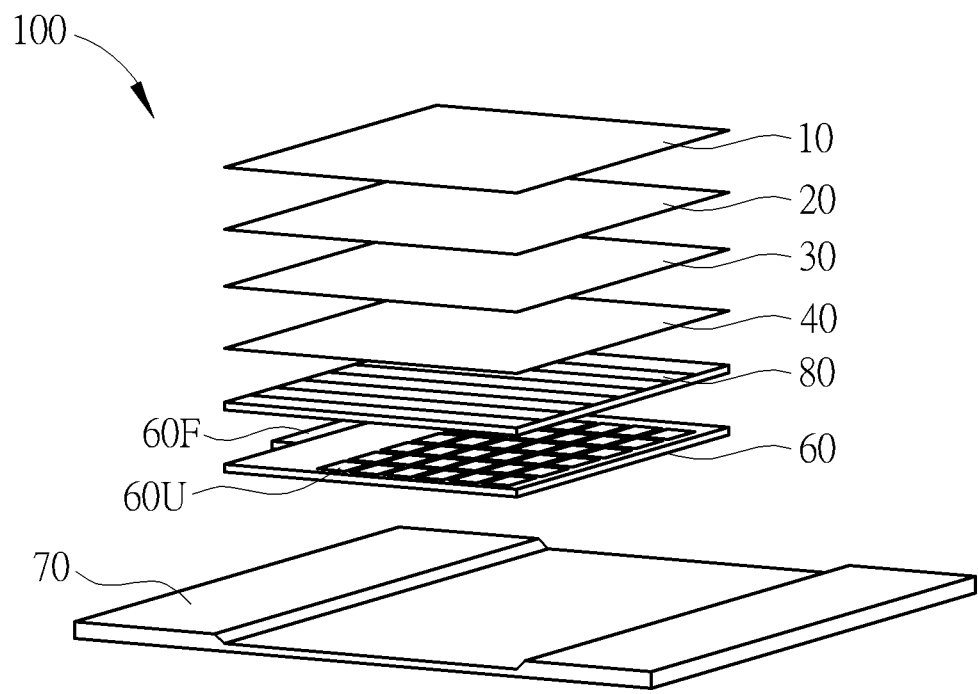
FIG. 2A is a structural diagram illustrating a touch display panel within the touch display device shown in FIG. 1.

FIG. 2A is a structural diagram illustrating the touch display panel 100 within the touch display device 50, where FIG. 2A takes the LCD panel as an example, but the present invention is not limited thereto. As shown in FIG. 2A, the touch display panel 100 may comprise multiple layers in the normal vector direction, and examples of the multiple layers may include a cover glass 10 (e.g. a layer of glass material, for being a surface layer of the touch display panel 100), a polarizer 20, a color filter (CF) 30, a common electrode 40, a liquid crystal 80, a Thin-Film Transistor (TFT) array substrate 60 and a backlight module 70, but the present invention is not limited thereto. As the general purposes of these layers should be well known by one skilled in the art, related details are omitted here for brevity. In addition, the touch display panel 100 further comprises a plurality of display units (e.g. a display unit 60U) and a circuit 60F (e.g. the data transmission circuit 140 shown in FIG. 1), which are configured in the TFT array substrate 60.

Figure 2B:
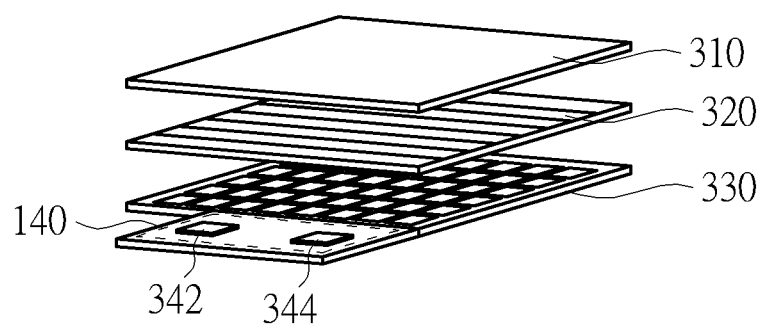
FIG. 2B illustrates an example of packaging circuitry of a data transmission circuit within the touch display device shown in FIG. 1 as a chip on film.

For brevity, in FIG. 2B, the cover glass 10, the polarizer 20, the color filter 30, and the common electrode 40 may be collectively referred to as an upper board 310, and the TFT array substrate 60 and the backlight module 70 may be collectively referred to as a lower board 330, where the liquid crystal 80 may be an example of a middle layer 320. In the embodiment shown in FIG. 2B, the data transmission circuit 140 may comprise a read out integrated circuit (ROIC) 342 and such as a Touch and Display Driver Integration (TDDI) circuit 344 (e.g. a touch with display driver), and the ROIC 342 and the TDDI circuit 344 may be packaged as one chip on film (COF), For example, the TDDI circuit 344 is a technical solution scheme for integrating a driver chip and a touch chip into one chip, and the present invention further integrates the ROIC 342 (e.g. a fingerprint read chip) and the TDDI circuit 344 into a same layer.

Figure 3:
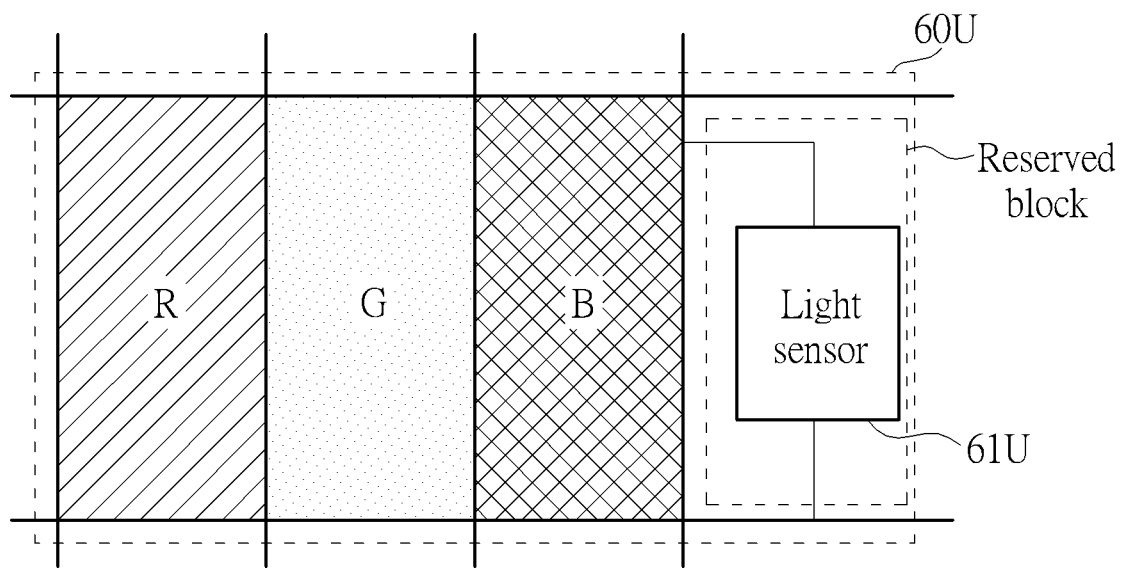
FIG. 3 is a diagram illustrating a display unit according to an embodiment of the present invention.

Proceed to FIG. 3, which is a diagram illustrating the display unit 60U according to an embodiment of the present invention, where the display unit 60U may be an example of at least one display unit within the touch display panel 100. As shown in FIG. 3, the display unit 60U may comprise multiple display blocks (which are respectively labeled "R", "G" and "B"). After being filtered by the color filter 30 shown in FIG. 2A, these display blocks may be configured to display red, green and blue images, respectively. The display unit 60U further comprises a reserved block for configuring a sensor unit therein (e.g. a light sensor 61U shown in FIG. 3).

Figure 4A:
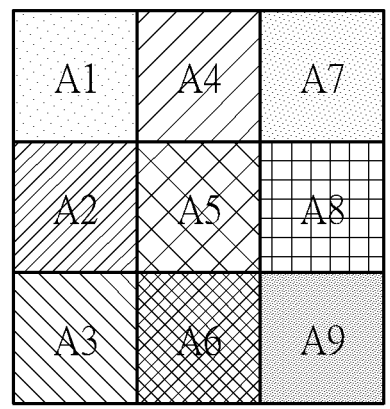
FIG. 4A is an example of a set of display units corresponding to a codebook.

The touch display panel 100 may further comprise one or more codebooks which are correspondingly configured above the display units 60U, to make the light sensors 61U receive sensing information of the object which is put on the touch display panel 100. More particularly, the light sensors 61U merely receive color spectrum information belonging to specific color spectrums only. FIG. 4A is an example of a set of display units corresponding to a codebook. In this embodiment, there are only nine adjacent display units A1, A2, A3, A4, A5, A6, A7, A8 and A9 (e.g. with a 3×3 arrangement) as an example, but the present invention is not limited thereto.

In this embodiment, the codebook may comprise nine color spectrum dividers which are respectively configured on respective sensor units of the display units A1, A2, A3, A4, A5, A6, A7, A8 and A9, e.g. above the light sensor 61U shown in FIG. 3. These nine color spectrum dividers correspond to different frequency bands, respectively, and the light sensors within the display units A1 to A9 merely receive color information of the frequency bands, respectively. In one embodiment, the color spectrum dividers may be manufactured in the color filter 30 shown in FIG. 2A. In another embodiment, an additional color filter may be adopted to install the color spectrum dividers above the sensor units. In one embodiment, it should be noted that the codebooks are distributed with a predetermined density (e.g. uniformly distributed) in the touch display panel 100. For example, one codebook may be configured in every N display units (where N is a positive integer), but the present invention is not limited thereto. For example, the codebook can be configured in any display unit within the touch display panel 100, depending on the design requirement.

In operation, when the touch display device 50 detects that an object is put on the touch display panel 100, the touch display device 50 may utilize the backlight module 70 to emit light toward the cover glass 10. The light passes through the display blocks and is emitted to a surface of the object, and after the light is reflected by the object, reflected light carrying information related to the object (such as material, surface texture, etc. of the object) may be absorbed by the sensor units. As a result, the ROIC 342 reads out signals, which are generated in response to the reflected light by the sensor units, and outputs the signals to the processing circuit 120. The processing circuit 120 may compare these signals with predetermined information. Regarding the positions having codebooks configured thereon, only the light with specific wavelengths (or belonging to specific color spectrums) in the reflected light is able to pass through the color spectrum dividers within the codebooks and be absorbed by the sensor units.

When the position touched by the object has the codebook shown in FIG. 4A configured thereon, a sensor unit within the display unit A1 may merely receive a portion belonging to a first color spectrum within the reflected light, a sensor unit within the display unit A2 may merely receive a portion belonging to a second color spectrum within the reflected light, a sensor unit within the display unit A3 may merely receive a portion belonging to a third color spectrum within the reflected light, a sensor unit within the display unit A4 may merely receive a portion belonging to a fourth color spectrum within the reflected light, a sensor unit within the display unit A5 may merely receive a portion belonging to a fifth color spectrum within the reflected light, a sensor unit within the display unit A6 may merely receive a portion belonging to a sixth color spectrum within the reflected light, a sensor unit within the display unit A7 may merely receive a portion belonging to a seventh color spectrum within the reflected light, a sensor unit within the display unit A8 may merely receive a portion belonging to a eighth color spectrum within the reflected light, and a sensor unit within the display unit A9 may merely receive a portion belonging to a ninth color spectrum within the reflected light.

Based on the operations mentioned above, the signals read out from the respective sensor units within the display units A1 to A9 may be configured to represent a color spectrum composition of the reflected light, and this color spectrum composition may vary in response to different materials of the object. Taking the fingerprint detection and recognition as an example, the processing circuit 120 may compare color spectrum information (e.g. the color spectrum composition) with reference information corresponding to a real fingerprint, to generate a comparison result, where the comparison result may indicate whether the object is a real finger. For example, the processing circuit 120 may analyze an intensity ratio between divided color spectrum signals within the color spectrum information (e.g. a ratio among the portions respectively belonging to the first color spectrum to the ninth color spectrum), and compare this intensity ratio with a reference ratio corresponding to the reference information, to generate the comparison result.

In one embodiment, the reference ratio may be obtained by analyzing reflected light from a real fingerprint in advance. Thus, when the comparison result indicates that similarity between the intensity ratio and the reference ratio is greater than a predetermined value, the processing circuit 120 may determine that the object is a real finger; otherwise, e.g. when the comparison result indicates that the similarity between the intensity ratio and the reference ratio is less than the predetermined value, the processing circuit 120 determines that the object is a fake finger (e.g. a fake finger manufactured by materials such as resin, silica gel, etc., or an object of any material different from real skin).

Figure 4B:
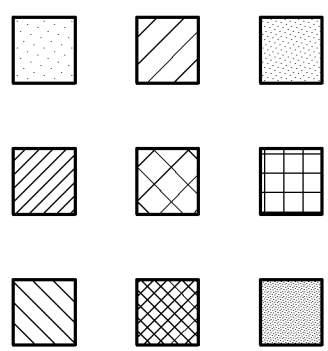
FIG. 4B is another example of a set of display units corresponding to a codebook.

It should be noted that the codebook mentioned above is not limited to be arranged in specific pattern(s), where the codebook of the embodiment shown in FIG. 4A corresponds to nine adjacent display units, but the present invention is not limited thereto. For example, the display units having the color spectrum dividers configured thereon may be not adjacent to each other (as illustrated by the pattern shown in FIG. 4B where the display units having the color spectrum dividers configured thereon are arranged by taking one or more display units as intervals between each other). As long as the aforementioned each codebook is able to divide the portions belonging to respective color spectrums from the reflected light, these alternative designs should be included in the scope of the present invention.

Figure 5:
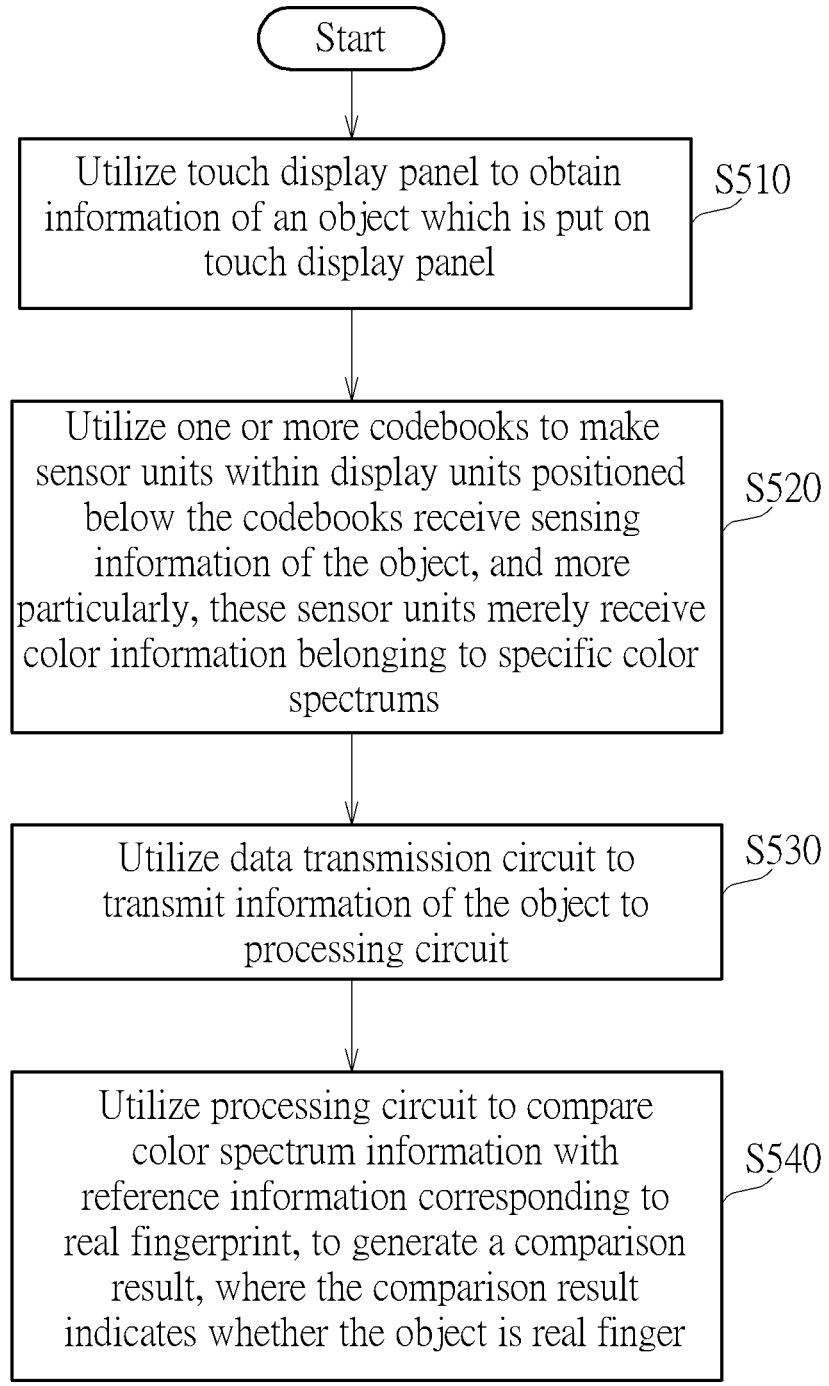
FIG. 5 is a working flow illustrating a fingerprint anti-spoofing method according to an embodiment of the present invention.

FIG. 5 is a working flow illustrating a fingerprint anti-spoofing method according to an embodiment of the present invention, where the fingerprint anti-spoofing method can be applied to the touch display device 50 shown in FIG. 1. It should be noted that the working flow is for illustrative purposes only, and is not meant to be a limitation of the present invention. One or more steps may be added, deleted or modified in this working flow. Furthermore, if a same result can be obtained, these steps do not have to be executed by the exact order shown in FIG. 5.

In Step S510, the touch display device 50 may utilize the touch display panel 100 to obtain information (e.g. fingerprint information) of an object which is put on the touch display panel 100.

In Step S520, the touch display device 50 may utilize one or more codebooks to make sensor units within display units positioned below the codebooks receive sensing information of the object, and more particularly, these sensor units merely receive color information belonging to specific color spectrums.

In Step S530, the touch display device 50 may utilize a data transmission circuit 140 to transmit the information of the object (which may comprise the aforementioned sensing information such as the aforementioned color spectrum information) to the processing circuit 120.

In Step S540, the touch display device 50 may utilize the processing circuit 120 to compare the color spectrum information with reference information corresponding to a real fingerprint, to generate a comparison result, where the comparison result indicates whether the object is a real finger.

In one embodiment, the processing circuit 120 may adopt a neural network (NN) artificial intelligence algorithm to compare the color spectrum information with the reference information. For example, a system developer may collect multiple fake fingerprint samples (such as some materials that might be arranged to manufacture a fake fingerprint, e.g. resin, silica gel, etc.) and at least one real fingerprint sample, and then analyze the multiple fake fingerprint samples and the at least one real fingerprint sample, in order to obtain responses of each of these real/fake fingerprint samples regarding colored light. For example, when the colored light (e.g. white light) is emitted to the resin, the reflected light may be parsed as being composed of signals respectively belonging to multiple color spectrums with a first ratio; when the colored light (e.g. white light) is emitted to the silica gel, the reflected light may be parsed as being composed of signals respectively belonging to multiple color spectrums with a second ratio; and when the colored light (e.g. white light) is emitted to the real skin, the reflected light may be parsed as being composed of signals respectively belonging to multiple color spectrums with a third ratio. With a large collection of real/fake samples, these samples may be utilized for training one or more parameters/coefficients within the NN artificial intelligence algorithm, and the NN artificial intelligence algorithm may calculate each of these samples to obtain a confidence value (e.g. the similarity of the intensity ratio and the reference ratio mentioned above) to determine a threshold of the confidence value (e.g. when the confidence value is greater than the threshold, the object would be determined to be a real finger), to thereby establish a complete analyzing system and algorithm, allowing the processing circuit 120 to utilize the NN artificial intelligence algorithm to distinguish between a real finger and a fake finger.

To summarize, the touch display device and the associated fingerprint anti-spoofing method provided by the embodiments of the present invention can utilize the codebook (e.g. the color spectrum divider therein) to perform color spectrum division on the reflected light from the object, and determine whether the object is a real fingerprint by analyzing the color spectrum composition of the reflected light. As the fake fingerprint is hard to be manufactured using real skin, the color spectrum composition of the reflected light of the fake fingerprint may be different from that of the real fingerprint, and the real fingerprint and the fake fingerprint can be distinguished by the touch display device provided by the embodiments of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display device with a fingerprint anti-spoofing function, comprising:
    a touch display panel, comprising:
        a plurality of display units, wherein each of the plurality of display units comprises a sensor unit; and
        one or more codebooks, corresponding to one or more sets of display units, configured to make the sensor units receive color spectrum information of sensing information of an object which is put on the touch display panel, wherein the codebooks comprises:
            a plurality of color spectrum dividers, configured above corresponding sensor units, wherein the color spectrum dividers correspond to a plurality of color spectrums, respectively, and each of the sensor units merely receive a corresponding one of divided color spectrum signals respectively belonging to the plurality of color spectrums in the color spectrum information; and
        a processing circuit, configured to obtain the sensing information from the sensor units, analyze an intensity ratio between the divided color spectrum signals within the color spectrum information, and compare the intensity ratio with a reference ratio corresponding to reference information, to generate a comparison result to determine whether the object is a real finger based on the sensing information and the reference information.

2. The touch display device of claim 1, wherein the codebooks are distributed with a predetermined density in the touch display panel.

3. The touch display device of claim 1, wherein the processing circuit determines the object is a real finger when the comparison result indicates a similarity between the intensity ratio and the reference ratio greater than a predetermined value; and the processing circuit determines the object is a fake finger when the comparison result less than the predetermined value.

4. The touch display device of claim 1, wherein the processing circuit adopts a neural network (NN) artificial intelligence algorithm to compare the color spectrum information with the reference information, to generate the comparison result.

5. The touch display device of claim 1, wherein the sensor unit is manufactured in a Thin-Film Transistor (TFT) array substrate of the touch display panel.

6. The touch display device of claim 1, wherein the codebooks are manufactured in a color filter of the touch display panel.

7. The touch display device of claim 1, wherein the processing circuit obtains the sensing information from the sensor units through a data transmission circuit.

8. The touch display device of claim 7, wherein the data transmission circuit comprises a read out integrated circuit (ROIC) and a Touch and Display Driver Integration (TDDI) circuit.

9. A fingerprint anti-spoofing method, which is applied to a touch display device, comprising:
    utilizing one or more codebooks of a touch display panel of the touch display device to make sensor units within display units corresponding to the codebooks receive color spectrum information of sensing information of an object which is put on the touch display panel, wherein the codebooks comprises:
        a plurality of color spectrum dividers, configured above corresponding sensor units, wherein the color spectrum dividers correspond to a plurality of color spectrums, respectively, and each of the sensor units merely receive a corresponding one of divided color spectrum signals respectively belonging to the plurality of color spectrums in the color spectrum information;
    transmitting the sensing information to a processing circuit of the touch display device; and
    utilizing the processing circuit to analyze an intensity ratio between the divided color spectrum signals within the color spectrum information, and compare the intensity ratio with a reference ratio corresponding to reference information, to generate a comparison result to determine whether the object is a real finger based on the sensing information and the reference information.

* * * * *